United States Patent [19]

Grasselli et al.

[11] 3,907,713

[45] Sept. 23, 1975

[54] SUPERIOR CATALYST PREPARED BY IMPREGNATION OF PREFORMED MATRIX

[75] Inventors: Robert K. Grasselli, Chagrin Falls; Dev D. Suresh, Warrensville Heights; Maria Friedrich, Cleveland, all of Ohio

[73] Assignee: The Standard Oil Company, Cleveland, Ohio

[22] Filed: Feb. 2, 1973

[21] Appl. No.: 329,034

[52] U.S. Cl. ............... 252/462; 252/456; 252/457; 252/458; 252/467; 252/470; 260/465.3
[51] Int. Cl.² .......................................... B01J 23/10
[58] Field of Search .......... 252/462, 467, 470, 456, 252/457, 458

[56] References Cited
UNITED STATES PATENTS

| | | | |
|---|---|---|---|
| 3,153,085 | 10/1964 | Hadley | 252/458 X |
| 3,347,899 | 10/1967 | Caporali et al. | 252/470 X |
| 3,409,561 | 11/1968 | Ferlazzo et al. | 252/462 X |
| 3,452,077 | 6/1969 | Caporali et al. | 252/462 X |
| 3,467,716 | 9/1969 | Kiff et al. | 252/470 X |
| 3,496,117 | 2/1970 | Vesely et al. | 252/458 X |
| 3,522,299 | 7/1970 | Takenaka et al. | 252/470 X |
| 3,551,470 | 12/1970 | Shaw et al. | 252/456 X |
| 3,642,930 | 2/1972 | Grasselli et al. | 252/464 X |
| 3,755,434 | 8/1973 | Levy | 252/470 X |
| 3,766,092 | 10/1973 | Hondo | 252/456 X |

*Primary Examiner*—Helen M. S. Sneed
*Attorney, Agent, or Firm*—Herbert D. Knudsen

[57] ABSTRACT

Very desirable oxidation catalysts are prepared by impregnating a catalytic oxide matrix containing at least cobalt and molybdenum, magnesium and molybdenum, nickel and molybdenum, manganese and molybdenum with iron, bismuth, tellurium or a mixture thereof.

8 Claims, No Drawings

3,907,713

SUPERIOR CATALYST PREPARED BY IMPREGNATION OF PREFORMED MATRIX

BACKGROUND OF THE INVENTION

The elements of the catalysts prepared according to the process of the present invention have been used in combination before. See for example, U.S. Pat. No. 3,642,930; Ser. No. 85,722 filed Oct. 30, 1970; Ser. No. 112,782 filed Feb. 4, 1971; and Ser. No. 293,795 filed Oct. 2, 1972. These catalysts have been prepared in the art by coprecipitation.

SUMMARY OF THE INVENTION

It has now been discovered by the present invention that highly desirable oxidation catalysts can be prepared by the steps of (a) impregnating a catalytic oxide matrix containing at least the oxides of cobalt and molybdenum, magnesium and molybdenum, nickel and molybdenum, manganese and molybdenum or mixture thereof with a liquid containing a compound of bismuth, iron, tellurium or mixture thereof that is at least partially soluble in the liquid, and (b) heating the impregnated matrix at an elevated temperature to form an active catalyst. These catalysts can employ a substantially smaller amount of the impregnated elements to obtain a catalyst that has the same desirability of a coprecipitated containing greater amounts of the impregnated elements. This is especially important in the case of very expensive raw materials such as bismuth because only a fraction of the amount of bismuth is required. Also, the present invention allows the preparation of a catalytic matrix and then the addition of a volatile or easily deactivated element to the preformed matrix.

An important aspect of the invention is the particular catalytic oxide matrix impregnated. As noted, the catalytic oxide matrix must contain at least cobalt and molybdenum, magnesium and molybdenum, nickel and molybdenum or manganese and molybdenum. Of course, mixtures of these various combinations with molybdenum could also be employed. One possible source of these matrixes is spent catalysts that could be rejuvenated by the impregnation of the present invention.

The many other elements that can be and have been added to the necessary components of the catalytic oxide matrix are well known in the art. The patents and applications discussed in the Background of the Invention are typical examples. Preferred among these elements are the Group I, Group II, Group IV, Group V, Group VIB, Group VIIB and the rare earth elements. All of these elements have been incorporated into the various oxidation catalysts.

The catalytic matrix can be prepared by methods that have been traditionally used for the preparation of the catalysts themselves. The only difference is that the iron, bismuth or tellurium component usually incorporated is excluded in the catalyst preparation. The catalytic oxide matrix may be prepared by the coprecipitation of the desired components, and the heating of the product in air. A number of the catalytic oxide matrixes are available commercially and these too can be used to prepare the catalysts of the invention.

After the catalytic matrix is prepared, it can be heat treated to at least partially set up the lattice structure. This heating may vary widely and is dependent upon the particular catalytic oxide matrix and the elements to be impregnated. Generally, heat treatment of the matrix at a temperature of about 200° to about 600°C. is preferred.

The impregnation of the catalytic oxide matrix is most conveniently accomplished by contacting the matrix with a liquid that contains a compound of iron, bismuth or tellurium that is at least partially soluble in the liquid. The contact is designed so that the bismuth, iron or tellurium in the liquid is transferred from the liquid to the catalytic matrix. Desirable contact of the matrix with the liquid is conveniently accomplished by mixing the liquid and the matrix at room temperature.

In the preferred practice of the invention, the liquid used to impregnate the catalytic oxide matrix is a solution of a soluble iron, bismuth or tellurium compound in a solvent. Most preferred because of the reduction in liquids handling is the use of a solution that contains a high concentration (at least 60% of saturation) of the iron, bismuth or tellurium compound. Also in the preferred practice of the invention the solvent employed in the impregnation is water, although other liquids such as alcohols, hydrocarbons, ethers, ketones and chlorinated hydrocarbons could be used provided that the elements to be impregnated are at least partially dissolved in the liquid.

Although iron, bismuth or tellurium may be impregnated into the catalytic matrix alone or in combination, it is also possible to impregnate the matrix with other elements at the same time. For example, a solution of bismuth nitrate and potassium hydroxide in water could be used to impregnate a matrix containing the oxides of nickel, cobalt and molybdenum.

As noted, the conditions under which the matrix is impregnated with the liquid are not critical. Substantially any set of conditions that permit the transfer of the dissolved components in the liquid into the matrix is acceptable. One of the best techniques of impregnating the matrix is to make a paste from the catalytic matrix and a highly concentrated solution of the compound to be impregnated. This paste can then be mixed or extruded to obtain uniform impregnation.

After the matrix is impregnated, the catalyst is prepared by drying and calcining the impregnated matrix according to the techniques that are normally applied to oxidation catalysts. These techniques involve the heating of the product in air at an elevated temperature. Usually, temperatures of about 300° to about 800°C. are employed to give a desirable catalyst, but the heat treatment for optimum catalyst activity varies with the composition of the catalyst.

The catalysts prepared by this invention have a number of uses. The most prominent of the uses is in the ammoxidation of olefins and methyl-substituted aromatic compounds, the oxidation of olefins and the oxidative dehydrogenation of butenes and isoamylenes. In addition, the process of the invention could be used to make catalysts for esterification reactions, oxychlorinations and the like.

Using the process of the invention, however, desirable catalysts are formed which are very effective even with low concentrations of the elements impregnated.

SPECIFIC EMBODIMENTS

Comparative Examples A–B and Examples 1–2 — Comparison of impregnated catalysts with matrix and coprecipitated catalyst.

A catalytic oxide matrix of the formula 80%

$K_{0.1}Mg_5Ni_3Fe_3P_{0.5}Mo_{12}O_x$ — 20% $SiO_2$ was prepared by coprecipitation as described in U.S. Pat. No. 3,642,930. In the formula x is the number of oxygens to satisfy the valence requirements of the other elements present. The preparation was conducted in the same manner as shown in the patent except that the bismuth compound was left out. The matrix formed was heated at 290°C. for 5 hours. After the resulting material cooled to room temperature, it was ground and screened through a 100 mesh screen.

An impregnating solution was prepared by dissolving 0.73 g. $Bi(NO_3)_3.5H_2O$ in 10 cc. of dilute nitric acid. This solution was mixed with the finely ground catalyst at room temperature and enough water was added to make a stiff, putty-like material. This material was extruded onto aluminum foil. The product was dried at room temperature and then at 120°C. The nitrates were decomposed, and the catalyst was heated at 550°C. for 16 hours.

The catalyst prepared could be written as [80% $K_{0.1}Mg_5Ni_3Fe_3P_{0.5}Mo_{12}O_x$ — 20% $SiO_2$] $Bi_{0.1}$ or [$K_{0.1}Mg_5Ni_3Fe_3P_{0.5}Mo_{12}O_x$] $Bi_{0.1}$ (the latter designation leaving out the $SiO_2$ which is part of the matrix). This signifies that the matrix in the brackets was impregnated with 0.1 atom of bismuth.

This catalyst, prepared according to the invention, was ground and screened to 20 × 35 mesh, and 5 cc. of the catalyst was placed in a fixed bed reactor that is constructed of a tube having an inlet for reactants and an outlet for products. This reactor was used to test the catalyst for effectiveness in the ammoxidation of propylene. The reactor was maintained at 400°C. and the reactants were fed into the reactor in a ratio of propylene:$NH_3$:air:$H_2O$ equal to 1:1.1:10:4. The apparent contact time was 6 seconds. The reaction was prerun for 15 minutes, and the results were obtained from the reaction effluent collected over 30 minutes.

Table I shows the results obtained with the catalyst described above as compared to the activity of the matrix and the activity of a catalyst prepared by coprecipitation to demonstrate the superiority of the method of preparing catalysts by the present invention. Comparative Example A is the catalytic oxide matrix prior to impregnation with bismuth. Comparative Example B shows a catalyst of the art which was prepared by coprecipitation. Example 1 shows the catalyst of the invention prepared by impregnation as described above. Example 2 shows a catalyst impregnated with twice as much bismuth as Example 1.

The results are expressed as follows:

$$\% \text{ conversion} = \frac{\text{moles of propylene fed} - \text{moles of propylene recovered}}{\text{moles of propylene fed}} \times 100$$

$$\% \text{ selectivity} = \frac{\text{moles of acrylonitrile recovered}}{\text{moles of propylene reacted}} \times 100$$

$$\% \text{ per pass conversion (p.p.c.)} = \frac{\text{moles of acrylonitrile recovered}}{\text{moles of propylene fed}} \times 100$$

TABLE I

COMPARISON OF CATALYST MATRIX AND COPRECIPITATED CATALYST WITH CATALYSTS OF THE INVENTION

| Ex. | Catalyst (contains 20% $SiO_2$) | Ammoxidation Results, % | | |
|---|---|---|---|---|
| | | Conv. | Sel. | P.P.C. |
| Comp. A | $K_{0.1}Mg_5Ni_3Fe_3P_{0.5}Mo_{12}O_x$ (matrix) | 15.4 | 46 | 7.1 |
| Comp. B | $K_{0.1}Mg_5Ni_3Fe_3P_{0.5}Bi_{0.1}Mo_{12}O_x$ (coprecipitated) | 76.7 | 63 | 48.3 |
| 1 | [$K_{0.1}Mg_5Ni_3Fe_3P_{0.5}Mo_{12}O_x$] $Bi_{0.1}$ (impregnated) | 96.1 | 84 | 80.7 |
| 2 | [$K_{0.1}Mg_5Ni_3Fe_3P_{0.5}Mo_{12}O_x$] $Bi_{0.2}$ (impregnated) | 98.5 | 87 | 85.7 |

It is clearly seen from the examples that the results obtained with catalysts prepared by the process of the invention are extremely active in the preparation of acrylonitrile from propylene even when small amounts of the impregnated elements are present.

Comparative Examples C–D and Examples 3–5 —
Impregnation with bismuth, iron and tellurium individually.

In the same manner as described in the examples above, catalyst matrix was prepared. For Example 3, the catalytic matrix was heated at 550°C. for 20 hours, impregnated by techniques described above and then heated at 550°C. for 3 hours. For Example 4, the catalytic matrix was heated at 290°C. for 5 hours, impregnated and heated at 650°C. for 16 hours. For Example 5, the catalytic matrix was heated at 425°C. for 16 hours, impregnated and heated at 550°C. for 20 hours. The ammoxidation results are shown in Table II as compared to the activity of the catalytic matrix.

TABLE II

IMPREGNATION WITH BISMUTH, IRON OR TELLURIUM INDIVIDUALLY

| Example | Catalyst (contains 20% silica) | Conv. | Sel. | P.P.C. |
|---|---|---|---|---|
| Comp. C | $K_{0.1}Ni_{2.5}Co_{4.5}Fe_3P_{0.5}Mo_{12}O_x$ | 26.3 | 43 | 11.3 |
| 3 | [$K_{0.1}Ni_{2.5}Co_{4.5}Fe_3P_{0.5}Mo_{12}O_x$] $Bi_{0.1}$ | 95.9 | 81 | 77.7 |
| 4* | [$K_{0.1}Ni_{2.5}Co_{4.5}Fe_3P_{0.5}Mo_{12}O_x$] $Te_{0.1}$ | 65.9 | 75 | 49.4 |
| Comp. D | $K_{0.1}Ni_{2.5}Co_{4.5}BiP_{0.5}Mo_{12}O_x$ | 15.4 | 63 | 9.7 |
| 5 | [$K_{0.1}Ni_{2.5}Co_{4.5}BiP_{0.5}Mo_{12}O_x$] $Fe_{0.1}$ | 99.1 | 79 | 78.3 |

*Reaction run at 460°C.

Comparative Examples E–I and Examples 6–10 —
Impregnation with bismuth and iron.

In the same manner as shown in the examples above, catalytic oxide matrixes of the basic matrix combinations of the present invention were prepared and impregnated. The cobalt and molybdenum matrix was prepared, heat treated at 425°C. for 16 hours, impregnated and then heat treated at 550°C. for 16 hours. The nickel and molybdenum matrix, both magnesium and molybdenum matrixes and the manganese and molybdenum matrix were prepared, heat treated at 425°C. for 16 hours, impregnated and heat treated at 650°C. for 3 hours.

The activity of the impregnated catalyst was compared to that of the basic catalytic matrix in the ammoxidation of propylene as described in the examples above. The results of these comparisons are given in Table III.

TABLE III

IMPREGNATION OF BISMUTH AND IRON SIMULTANEOUSLY

| Example | Catalyst (Contains 20% $SiO_2$) | Ammoxidation Results, % | | |
|---|---|---|---|---|
| | | Conv. | Sel. | P.P.C. |
| Comp. E | $CoMoO_4$ | 36.9 | 26 | 9.6 |
| 6 | $[CoMoO_4]_{12}Fe_{0.3}Bi_{0.1}$ | 97.6 | 75 | 73.2 |
| Comp. F | $Ni_{11}Mo_{12}O_x$ | 65.3 | 15 | 9.8 |
| 7* | $[Ni_{11}Mo_{12}O_x]Fe_{0.3}Bi_{0.1}$ | 99.9 | 72 | 71.9 |
| Comp. G | $Mg_{11}Mo_{12}O_x$ | 17.5 | 8 | 1.4 |
| 8* | $[Mg_{11}Mo_{12}O_x]Fe_{0.3}Bi_{0.1}$ | 94.9 | 86 | 81.4 |
| Comp. H | $K_{0.1}Mg_{11}Mo_{12}O_x$ | 9.0 | 29 | 2.6 |
| 9** | $[K_{0.1}Mg_{11}Mo_{12}O_x]Fe_{0.3}Bi_{0.1}$ | 72.0 | 93 | 67.0 |
| Comp. I | $Mn_{11}Mo_{12}O_x$ | 42.5 | 4 | 1.6 |
| 10* | $[Mn_{11}Mo_{12}O_x]Fe_{0.3}Bi_{0.1}$ | 64.3 | 85 | 54.8 |

*run at 420°C.
**run at 425°C.

EXAMPLES 11–13

Life study of impregnated catalyst

The catalyst of Example 2 was run in a 5 cc. reactor for an extended time to determine the feasible life of the catalyst. The results of these tests are found in Table IV.

TABLE IV

LIFE OF IMPREGNATED CATALYST

| Example | Time, hrs. | Conv. | Sel. | P.P.C. |
|---|---|---|---|---|
| 2 | Initial | 98.5 | 87 | 85.7 |
| 11 | 0.25 | 98.6 | 85 | 83.8 |
| 12 | 17.25 | 92.1 | 82 | 75.5 |
| 13 | 24.00 | 94.4 | 84 | 79.3 |

It can be seen from the results in Table IV that the life of the impregnated catalysts is acceptable. The selectivity remains high throughout and the per pass conversion to acrylonitrile remains excellent over the duration of the life study.

In the same manner as shown by the examples above, other catalytic oxide matrixes containing at least cobalt and molybdenum, nickel and molybdenum, magnesium and molybdenum or manganese and molybdenum are impregnated with solutions containing iron, bismuth, tellurium or combinations thereof to produce very desirable catalysts for the oxidation of propylene to acrolein and acrylic acid, the oxidation of isobutylene to methacrolein and methacrylic acid, the oxidative dehydrogenation of n-butenes to butadiene and the oxidative dehydrogenation of isoamylene to isoprene. These catalysts are found to have superior properties to coprecipitated catalysts at low concentrations of bismuth, iron and tellurium. As a result, substantial savings in raw material costs can be realized without sacrifice of catalyst affectiveness.

We claim:

1. A process for preparing an oxidation catalyst comprising the steps of: (a) impregnating a catalytic oxide matrix containing at least the oxides of cobalt and molybdenum, magnesium and molybdenum, nickel and molybdenum, manganese and molybdenum or mixture thereof with water containing a compound of bismuth, iron, tellurium, individually or mixture thereof that is at least partially soluble in the water; and (b) heating the impregnated matrix from step (a) at an elevated temperature to form an active catalyst.

2. The process of claim 1 wherein the impregnation is conducted with a solution containing at least the iron, bismuth or tellurium compound dissolved in water.

3. The process of claim 2 wherein said solution contains a high concentration of the compound of iron, bismuth or tellurium.

4. The process of claim 1 wherein bismuth is impregnated into the catalytic oxide.

5. The process of claim 1 wherein iron is impregnated into the catalytic matrix.

6. The process of claim 1 wherein the impregnated catalyst is heated at a temperature between 300° and 800°C. in the presence of air.

7. The process of claim 1 wherein the catalytic matrix contains at least one element selected from Group I, Group II, Group IV, Group V, Group VIB, Group VIIB and the rare earth elements.

8. The catalyst prepared by the process of claim 1.

* * * * *